United States Patent [19]

Smith

[11] 4,122,624

[45] Oct. 31, 1978

[54] FISH ATTRACTOR

[76] Inventor: Brian F. Smith, 11332 Chalet Rd., Sidney, B. C., Canada

[21] Appl. No.: 766,798

[22] Filed: Feb. 8, 1977

[30] Foreign Application Priority Data

Feb. 20, 1976 [CA] Canada .................................. 246179

[51] Int. Cl.² .............................................. A01K 85/00
[52] U.S. Cl. ..................................... 43/42.33; 43/42.5
[58] Field of Search ............................. 43/42.33, 42.5

[56] References Cited

U.S. PATENT DOCUMENTS

| | | | |
|---|---|---|---|
| 2,670,559 | 3/1954 | Webb et al. ........................ | 43/42.33 |
| 2,933,847 | 4/1960 | Frasure ............................ | 43/42.33 x |
| 2,951,308 | 9/1960 | Kent .................................. | 43/42.33 |
| 3,656,253 | 4/1972 | Gaunt ................................ | 43/42.33 |

*Primary Examiner*—Louis G. Mancene
*Assistant Examiner*—Daniel J. Leach
*Attorney, Agent, or Firm*—Otto John Munz

[57] ABSTRACT

A flasher of the type of an elongated, double-bent plate-like member is produced from two generally identical transparent plastic plates having reinforcements at their edges and interlocking each other to enhance dimensional stability of bends at the front and rear ends. Sandwiched between the plates is a light reflexive sheet which is fully protected from water when the flasher is completed.

3 Claims, 4 Drawing Figures

FISH ATTRACTOR

This invention relates to a fish attractor or flasher of the type of an elongated, double-bent, plate-like member the end portions of which are arranged for being secured to a swivel of a line, the end portions of the member being bent away from the plane of a planar central part of the member, in mutually opposite directions.

The general type of the flasher to which the present invention relates is known from prior art of which Canadian Pat. No. 629,515 issued Oct. 24, 1961 to Donald E. Stackhouse, together with Canadian Pat. No. 928,068 issued June 12, 1973 to Jack R. Gaunt may be referred to as typical examples.

In the past, it had been assumed that the major purpose of flashers of this type is to imitate the natural movement of a crippled feeder fish. It has been proven, however, that in fact the flasher serves more as a feeding fish simulator rather than a means of imparting "action" to the lure. It has been noted that salmon, like most species of fish that possess natural protective features, are inclined to school.

When feeding, salmon injure, kill or incapacitate their prey by means of slashing bites, tail thrashing and violent body movements. As the attacking fish imparts this thrashing, flashes of light can be seen from the silver scaled side of the fish. This flash or light is, of course, duplicated by the reflective tape of the fish simulator. Other feeding salmon immediately following will then consume the already stunned prey. It has also been found that the attractor of the above type should be designed to impart to the lure the action of naturally swimming squid which dart angularly as they expel jets of water.

It follows from the above that it is important that the actual shape of the attractor of the above type be carefully selected and that provisions be made to secure the maintaining of the shape of the attractor over an extended period of use.

Previous attractors or flashers of the above type can be divided into two groups, the first group being typical by a flasher made from metal. The flasher of this type is represented by the above-noted Canadian Pat. No. 629,515. Its primary drawback is in a relatively high cost of manufacture due to a relatively expensive corrosion resistant metal which has to be used in the production. Moreover, the light reflective surface of such flashers tends to dull due to the attack by sea water and thus requires a more or less constant maintenance to keep the light reflecting properties.

The second group of flashers of the above type is represented by Canadian Pat. No. 928,068. This type is manufactured from plastics material to reduce the material cost. Reflexive tapes are adhered to the outside of such plastic flashers. The tapes soon become attacked by salt water, as in the case of the above mentioned metallic flashers. Moreover, the plastics from which flashers are normally manufactured inevitably fatigues thus causing the plate to flatten, i.e., to loose the proper shape with the resulting deficiency in the movement in water.

It is an object of the present invention to overcome the above drawbacks of the known flashers of the double-bent plate type and to produce a new and useful flasher which would not only maintain its high light-reflecting property but which would, at the same time, be capable of maintaining its predetermined shape even though it is manufactured from a plastics material normally used in production of plastic flashers, such as polycarbonate.

According to the invention, the fish attractor of the above type is an elongated, double-bent, plate-like member which comprises a first panel and a second panel, the two panels being arranged to form the plate-like member. Each of the panels has a generally planar, central portion and two end portions bent away from the plane of the central portion. Each of the panels comprises arresting means for preventing the panels from displacement relative to each other in directions generally coincident with the surface of the plate-like member. The invention further comprises means for fixedly securing said panels together to form the plate-like member as a generally unitary piece. The light reflexing means of the flasher is a sheet of light reflexing material which is sandwiched between the two panels. The panels are fixedly secured to each other such as to simultaneously seal the sheet from the environment of the attractor in a watertight fashion. The panels are produced from a transparent thermoplastic material of the type normally used in fishing lures, e.g. from polycarbonate. The panels are each of a structure comprising a peripheral ridge which further assists in maintaining of the predetermined shape of the respective panels and thus of the entire flasher assembly. The flasher is thus capable of use for a longer period of time as it maintains its proper shape even though it is manufactured from a known plastics material which tends to be subject to fatigue.

The invention will now be described in greater detail with reference to the accompanying drawings, in which.

Figure 1:
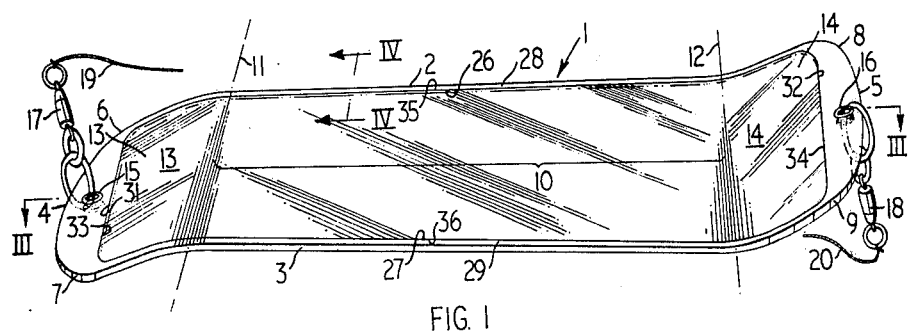
FIG. 1 is a perspective view of the attractor according to the present invention.

The drawings show a fish attractor or flasher 1 of the type of a light reflective, elongated, plate-like member. The member has two side edges 2, 3, a front edge 4 and a rear edge 5. Rounded joinder edges 6, 7 form a continuation of the front edge 4 merging with the side edges 2, 3, respectively. Similar rounded joinder edges 8, 9 extend between the rear edge 5 and the side edges 2, 3, respectively. The side edges 2, 3, are slightly divergent in the direction from the front edge 4 towards the rear edge 5. The plate-like member has a generally planar central portion 10, the central portion 10 being defined by substantial lengths of the side edges 2, 3 on its sides, by a front bend 11 and by a rear bend 12. The bends 11, 12, extend laterally of the member. Bend 11 defines a joinder between the central portion 10 and a generally planar front portion 13, while the bend 12 forms a similar joinder between the central portion 10 and a generally planar rear portion 14. The end portions 13, 14, are inclined at an obtuse angle with respect to the central portion 10 in mutually opposite directions with respect to the plane of the central portion 10. Attachment holes 15, 16 are provided near the front and rear edges 4, 5, respectively. The holes 15, 16 are used in securing the attractor to swivel means 17, 18 of respective lines 19, 20. The attractor further comprises light reflecting means which provides a substantial portion of the attractor surface with light reflecting property. The type of light reflecting means is a sheet 21 of Mylar (trademark). The overall arrangement and location of the sheet 21 with respect to the remaining portions of the attractor will be described hereinafter.

Figure 2:
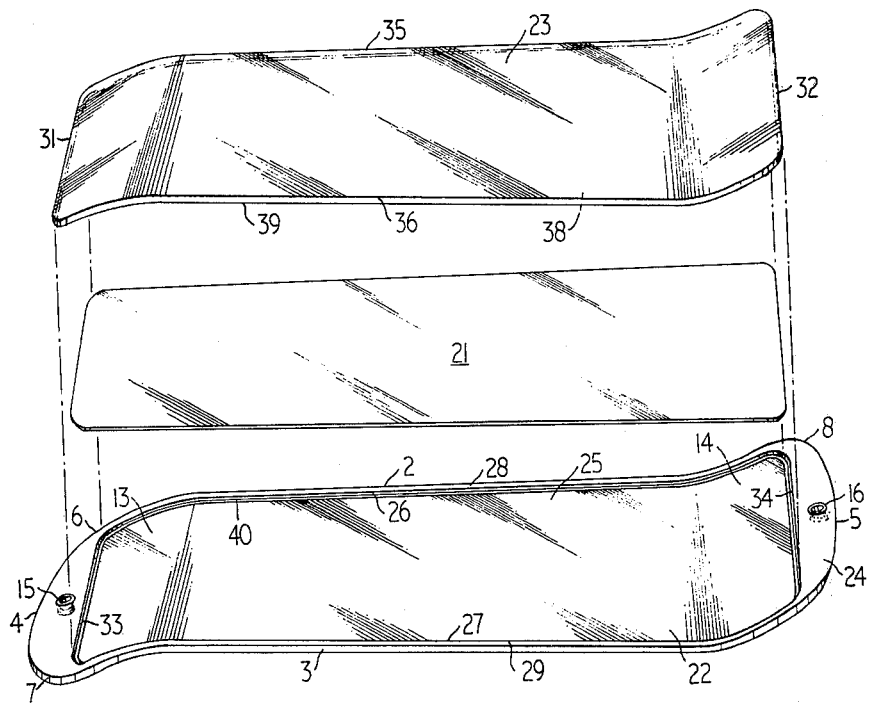
FIG. 2 is an exploded perspective view of the attractor.

As best seen from FIG. 2, the elongated, plate-like member consists of a base panel 22 (also referred to as a first panel) and of a cover panel 23, also referred to as a second panel.

Each of the panels 22, 23 is of a shape generally identical to the overall shape of the plate-like member. In other words, each of the panels has a central portion and two end portions which correspond to a substantial part of the central and end portions 10, 13, 14 of the plate-like member.

It will further be appreciated from FIG. 2 that the light reflecting Mylar sheet 21 is sandwiched between the panels 22, 23. The panels 22, 23 being made of a transparent, clear plastic material, of the type normally used in fish lures, e.g. polycarbonate, the flat chrome Mylar sandwiched between the panels 22, 23 provides the overall plate-like member with the appearance of a light reflecting plate.

One surface 40 of the base panel 22 is provided with a shallow, elongated cavity 25, the cavity being defined by walls 26, 27 which extend along and adjacent to the outside edges of the base panel 22, the outside edges being identical with the said side edges 2, 3 of the overall plate-like member. Thus, the inside edges 26, 27, together with the outside edges 2, 3 define each a longitudinal ridge 28, 29 extending along the side edges 2, 3. It will be appreciated that the top surface of the longitudinal ridges 28, 29 is coincident with and forms part of one face of the overall plate-like member.

The periphery of the cover panel 23 is so shaped as to provide a close fit of the cover panel 23 within the cavity 25 of the base panel 22. The thickness of the cover panel 23 with respect to the depth of the cavity 25 is so selected that the outside surface of the cover panel 23 provides a flush continuation of the associated surface 24 of the base panel 22.

Figure 3:
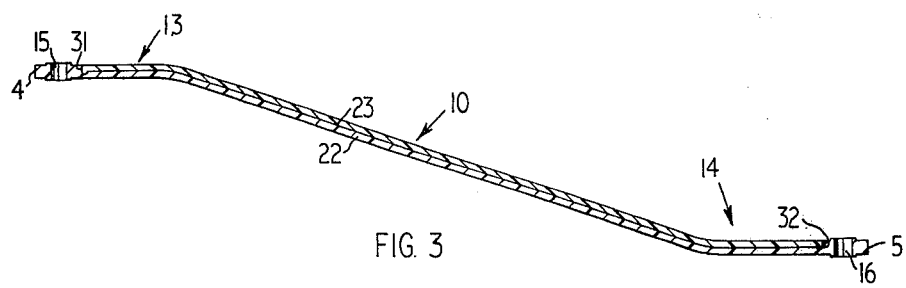
FIG. 3 is a longitudinal section taken on line III—III of FIG. 1.

As best seen from FIG. 3, the end edges 31, 32 of the cover panel 23 are located against the respective end walls 33, 34 of the cavity 25 to arrest the two panels 22, 23 with respect to each other against displacement in a horizontal direction as viewed in FIG. 1. Those skilled in the art will readily appreciate that due to this arresting action, the dimensional or shape stability of the plate-like member is enhanced, particularly with respect to the maintaining of the angle between the end portions 13, 14 and the middle portion 10 of the plate-like member. In general terms, therefore, it will be appreciated that each of the panels 22, 23 comprises arresting means which, when the plate-like member is assembled, prevent the panels 22, 23 from displacement relative to each other in at least two directions oriented generally longitudinally of the plate-like member. Side edges 35, 36 of the cover panel 23 match with the side walls 26, 27 of the base panel in a similar fashion.

Figure 4:
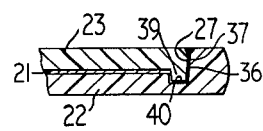
FIG. 4 is a transverse section taken on line IV—IV of FIG. 1.

As best seen from FIG. 4, even though the outside edges 35, 36, 31 and 32 are located against the respective side walls 26, 27, 33, 34 of the cavity 25, the tolerances are such that a certain amount of a bonding agent, such as cement 37 can be applied to one or both adjacent sides to fixedly secure the panels 22, 23 together. The cement used in the present invention is of the type that effectively seals the peripheral joint between the panels thus preventing water from entering the inside of the assembled plate-like member. When the attractor is in use, water can never reach the Mylar sheet 21.

Turning now to the representation of the cover panel in FIG. 2, it will be seen that its inside surface 38, facing the base panel 22, is provided with a peripheral ridge 39 which protrudes generally perpendicularly to the surface 38. The ridge 39 is received in a mating peripheral groove 40 provided in the base panel 22. Those skilled in the art will appreciate that the portion of ridge 39 extending along side edges of the cover panel 23 enhances the shape stability thereof, particularly in the area of bends 11, 12, while the portion of the ridge 39 extending along the ends of the cover panel 23 forms a further part of the arresting means as referred to hereinabove.

It will further be appreciated that the Mylar reflective sheets 21 has a contour generally corresponding to the inside periphery of the ridge 39. As best seen from the sectional views of FIGS. 3 and 4, the Mylar sheet is thus received inside the shallow cavity of cover panel 23, created by the ridge 39.

The end walls 33, 34 of the cavity 25 are spaced from the respective end edges of said plate-like member, so that the attachment holes 15, 16 are provided in a portion of the base panel having the thickness identical to the overall thickness of the eventually assembled plate-like member.

The invention thus provides a flasher whose dimensional stability is enhanced not only by the above features but also by the laminated overall structure itself.

It will be appreciated that a number of obvious modifications of the present invention are readily available. For instance, the peripheral ridges of the panels need not necessarily be continuous as shown in the present embodiment, even though it is believed that continuous ridges are superior from the standpoint of maintaining the shape of the plate-like member, particularly in the area of bends 11, 12. Another obvious modification one might consider would have both panels generally identical in shape and providing a space in between for receiving the reflective Mylar sheet. These and many other modifications of the above embodiment, however, do not depart from the scope of the present invention as defined in the accompanying claims.

The embodiments of the invention in which an exclusive property or privilege is claimed are defined as follows:

1. Fish attractor of the type of a light-reflective plate-like member having two side edges, a front end edge, a rear end edge and rounded joinder edges between each of said end edges and the respective side edges, said side edges being slightly divergent in the direction from said front end edge towards said rear end edge, said member having a generally planar, central portion whose sides are defined by a substantial portion of the length of each of said side edges, and whose ends are defined by a front bend and by a rear bend, said bends extending laterally of said member and defining joinders between said central portion and generally planar front and rear end portions, respectively, the end portions being inclined at an obtuse angle with respect to said central portion in mutually opposite directions with respect to a plane coincident with the surface of said central portion, and an attachment hole adjacent the front end edge and adjacent the rear end edge for securing said attractor to swivel means of a line; said plate-like member being composed from a first panel and a second panel, each of said panels being made of a transparent plastics material and having a central portion and two end portions generally corresponding to said central and end portions of the plate-like member; each of said panels comprising arresting means for preventing said panels, when assembled, from displacement relative to each other in at least the directions generally longitudinally and laterally of said plate; said first panel being provided in one surface thereof with a shallow, elongated cavity defined by a peripheral wall extending along and adjacent to the outside edges of said first panel, said outside edges of said first panel forming said side and end edges of the plate-like member, whereby a ridge is provided along each side and end edge of said first panel; said second panel having a peripheral edge arranged to closely fit within said cavity whereby said second panel produces a flush continuation of said one surface of the first panel, whereby the peripheral edges of said second panel are located against the respective portions of the peripheral wall of said cavity to form said arresting means, the peripheral edge of said second panel being in a generally abutted relationship with the associated portion of the peripheral wall of said cavity; means for joining the edges of said second panel with said peripheral wall of the cavity in a watertight fashion to produce a joinder seam between said panels, said joinder seam being generally coincident with only one face of said plate member; and a light reflecting sheet means providing a substantial portion of said plate-like member with light reflecting property, said light reflecting sheet means being located within said cavity and being sandwiched between said panels.

2. A device as claimed in claim 1, wherein the surface of said second panel facing said first panel is provided with a peripheral ridge protruding generally perpendicularly to said surface, said ridge being received in a mating peripheral groove provided in said first panel along the peripheral wall of said cavity.

3. A device as claimed in claim 2 wherein said sheet of light reflexive material is of a contour corresponding to the inside periphery of said ridge of said second panel.

* * * * *